(No Model.) 3 Sheets—Sheet 1.

C. W. CARTER.
STREET CAR BRAKE.

No. 563,446. Patented July 7, 1896.

Witnesses:
Henry B. Avry
Fred S. Lyon

Inventor:
Clarence W. Carter.
By Paul O. Hawley
his attorneys

THE NORRIS PETERS CO., PHOTO-LITHO., WASHINGTON, D. C.

(No Model.) 3 Sheets—Sheet 2.

C. W. CARTER.
STREET CAR BRAKE.

No. 563,446. Patented July 7, 1896.

Witnesses:
Henry B. Avery.
Fred. S. Lyon

Inventor:
Clarence W. Carter.
By Paul O. Hawley
his attorneys.

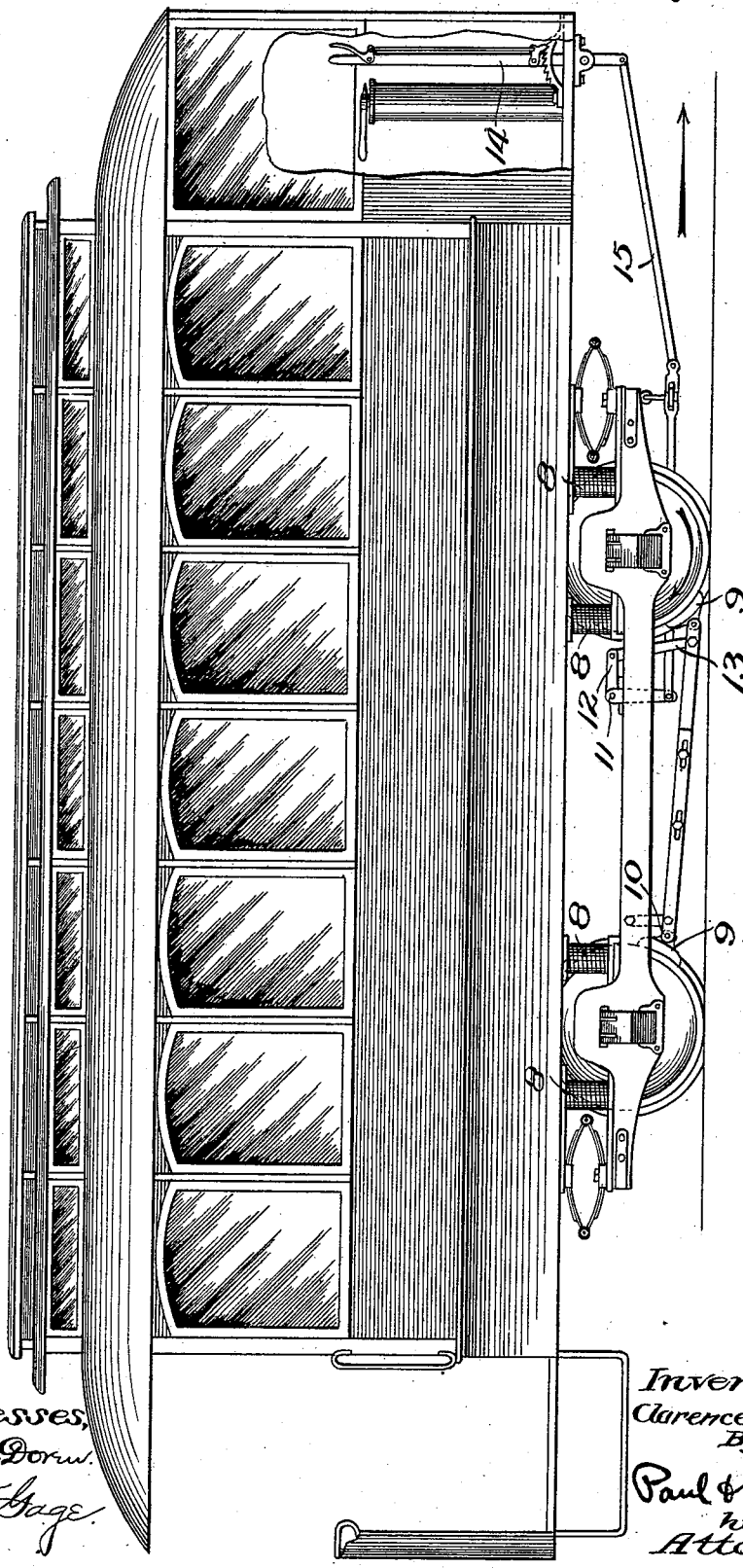

UNITED STATES PATENT OFFICE.

CLARENCE W. CARTER, OF MINNEAPOLIS, MINNESOTA, ASSIGNOR TO SAMUEL C. CARTER, OF CHICAGO, ILLINOIS.

STREET-CAR BRAKE.

SPECIFICATION forming part of Letters Patent No. 563,446, dated July 7, 1896.

Application filed September 29, 1894. Serial No. 524,458. (No model.)

*To all whom it may concern:*

Be it known that I, CLARENCE W. CARTER, of Minneapolis, Hennepin county, Minnesota, have invented certain new and useful Improvements in Street-Car Brakes, of which the following is a specification.

My invention relates to car-brakes and particularly to brakes for street-cars, and the object of my invention is to provide a brake which is peculiarly applicable to street-cars that have a front and a rear end, and in service are run in one direction only, and in particular to street-cars of this class which carry their own motors, such, for instance, as electric or like motor cars.

The requirements of a street-car brake are that the same shall be of light weight, shall occupy but little space, may be operated quickly and with a comparatively small power, and which, after being applied, will act quickly and yet so gradually as to neither slip upon the wheels, or, upon the other hand, lock the same and thus cause annoying jars and shocks. Furthermore, the brake must be capable of being quickly released without sticking or clinging to the wheels, and, lastly, must be not only cheap but durable. All of these objects I have in view in the present invention.

A further object is to provide a street-car brake which shall be applied by power exerted in the direction of the movement of the car-wheels, and wherein moving power acting through the wheels upon the forward brake-shoes aids the manual force in setting the brake, and further provides a street-car brake which has a very short throw or lift, thus gaining an advantage in time as well as in the distance through which the brake lever or wheel must be operated by the driver.

The invention will be more readily understood by reference to the accompanying drawings, forming part of this specification, and in which—

Figure 3:
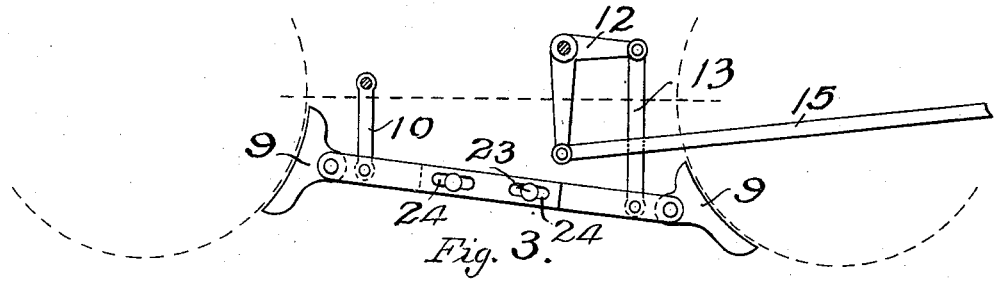
Figure 1:
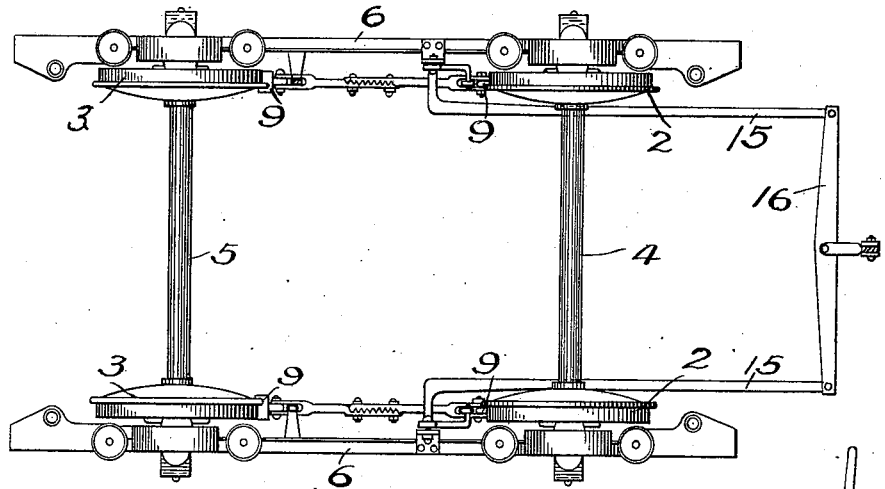
Figure 2:
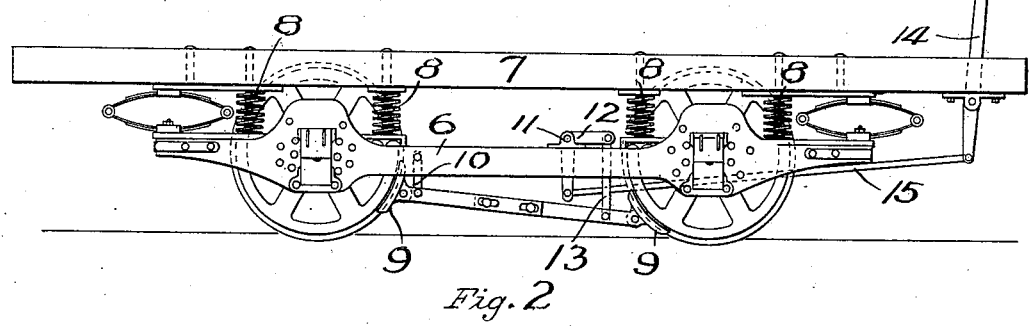
Figure 4:
Figure 5:
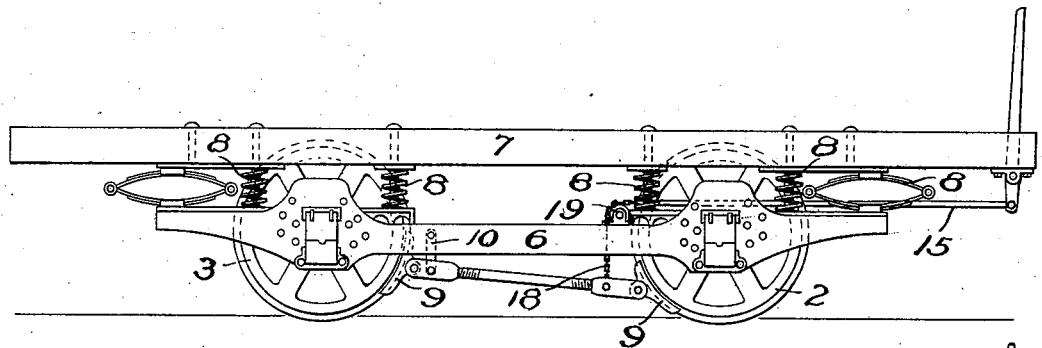
Figure 6:
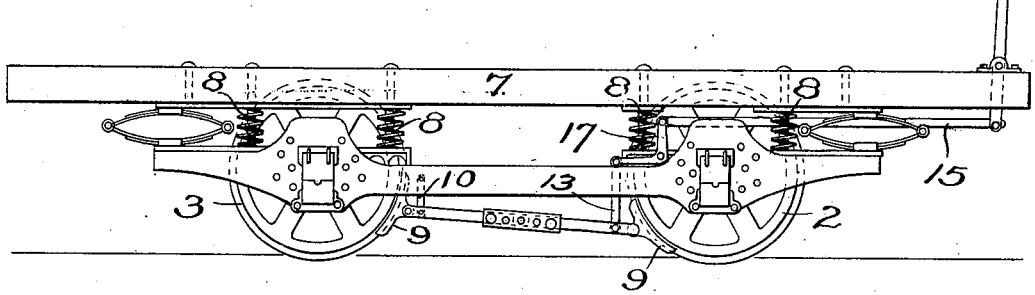
Figure 8:
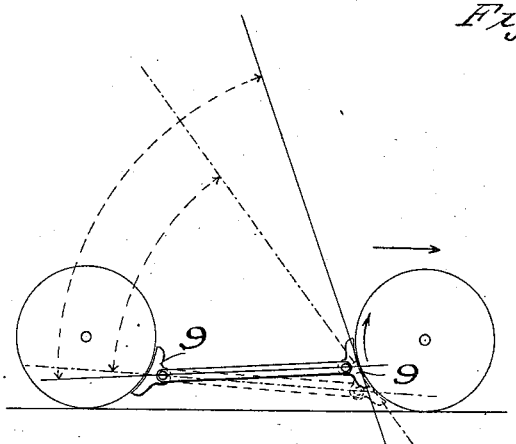
Figure 7:
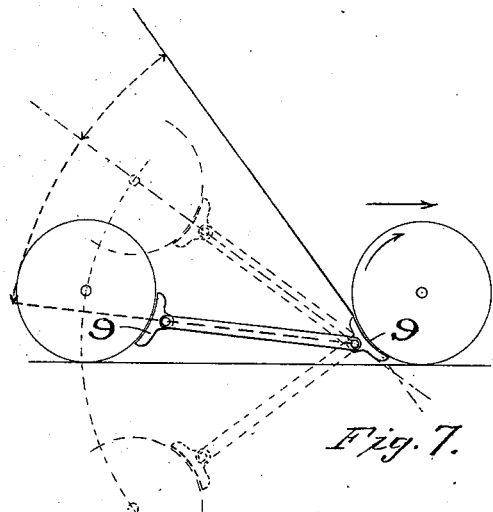

Figure 1 is a plan view of a car-truck provided with a car-brake embodying my invention. Fig. 2 is a side view thereof. Figs. 3 and 4 are respectively enlarged side and plan detail views showing the construction of the adjustable connecting-rods employed between opposite brake-shoes. Fig. 5 is a view similar to Fig. 2, showing a different take-up mechanism. Fig. 6 is a similar side elevation showing a bell-crank take-up differing from the form shown in Figs. 1 and 2. Figs. 7 and 8 are diagrammatic views employed to illustrate the results of two different positions of the forward brake-shoe. Fig. 9 is a side elevation of a car having my invention applied thereto.

In the drawings, 2 2 and 3 3 represent forward and rear pairs of wheels of the truck joined by the forward and rear axles 4 and 5, respectively. These axles have bearings in and support the truck-frame 6, which in turn supports the car-body, of which the narrow timbers 7 are above shown. Cushion-springs 8 of various kinds are ordinarily interposed between the body and the rigid frame. A brake-shoe 9 is provided for each wheel, the same being applied to the inner side thereof, that is, between the wheels.

The shoes of opposite wheels on the same side of the truck are rigidly connected by a bar which fixes the shoes with relation to one another. There is a pair of shoes and one of these bars between each two wheels. The rear end of each bar is suitably supported by a pivotal link 10, pivoted thereon and to the overlying truck-frame, the link preventing vertical movement of the rear end of the bar. The forward end of the bar is supported by a take-up mechanism, the downward movement of which is limited to prevent the shoe falling upon the rail, while the upward movement is limited only by the engagement of the shoe with the wheel. The take-up mechanism extends forward and is connected with the brake-stand, which is situated upon the forward end or platform of the car, which is constructed to run in but one direction. This brake is in fact intended and adapted only for use on such single-direction cars, the action of my brake being less powerful or advantageous than an ordinary brake when the car or vehicle is moved backward, for then the motion of the wheels operates against the manual effort.

The take-up mechanism employed may be of various forms. In Figs. 1 to 4 I have illustrated the bell-crank construction of take-up which I prefer. Suitable blocks or bearings 11 are provided on the side beams of the truck-frame and upon these the bell-cranks 12 may be securely pivoted. The forwardly-extending and upper arm of the bell-crank is connected by a pivotal link 13 to the brake-rod, which extends between the shoes. The downwardly-extending arm is connected with the lever or other brake-stand 14 by a single rod 15, the inner end of which engages the bell-crank. The arrangement is similar upon the opposite sides of the truck and the two draft-rods 15 instead of being connected directly to the brake-lever may be and are preferably joined to an equalizing-bar 16, at the middle of which the lever or brake-stand connection is made. In place of this exact construction, what may be termed a "reverse form" of the bell-crank take-up may be used, as shown in Fig. 6, where the bell-crank 17 is inverted, the rearwardly-extending arm being connected to the link 13, while the upwardly-extending arm is connected with the draft-rod 15. The first construction is preferred simply because it takes less space upon the top of the truck and therefore in no wise interferes with the oscillation or depression of the car-body on the springs.

A very simple take-up consists in the chain 18, passing over a pulley 19, fixed on the truck-frame and fastened at its lower end to the brake-rod, and at its upper end connected with the draft-rod 15. In all of these forms of take-ups it will be noted that the pull upon the brake-rod and therefore on the shoes is exerted in the direction of the upward-moving adjacent peripheries of the front car-wheels. Provision is made for taking up the wear in the shoes, the brake-rod being preferably made in two parts 20 and 21, the inner ends of which are similarly formed with fine teeth or corrugations, which lock into one another, the overlapping ends being secured together by small bolts 23, which pass through longitudinal slots 24 therein, which permit relative longitudinal adjustment of the two parts of the rod. It will be noted that the forward brake-shoe is, in each case, lower than the rear brake-shoe, and that the link 10 is preferably connected to the brake-rod at a point somewhat forward of the shoe, both for reasons to be hereinafter explained.

The operation of my brake may be explained as follows: Assume the car to be thus equipped and to be running forward, the car would be stopped by the driver pulling back on the brake-stand lever 14, and thereby operating the bell-cranks and other take-up devices simultaneously on opposite sides of the truck to raise the two forward brake-shoes into engagement with the lower sides and upgoing peripheries of the forward wheels. As the shoes strike the inner sides of the forward wheels they are forced back somewhat, the result being to apply the rear shoes to the downgoing peripheries of the rear wheels, after which the manual effort is exerted to hold the front shoes in their raised positions against the wheels, which have a tendency to further raise the forward brake-shoes, crowding them and the rear brake-shoes firmly against the wheels. As the frictional engagement between the front shoes and the front wheels is controlled primarily by the manual effort at the brake-stand, it is obvious that the action of the wheels will be in proportion to the manual effort, increasing or decreasing therewith. The force of the wheels is greater in fact than the manual effort, and it is on account of this that it becomes necessary to arrange the shoes as close on the bottoms of the wheels as possible, so that the force of the wheels being exerted in more direct tangential lines will in consequence be less in proportion to the manual effort, though still greater in case the shoes were applied at more acute angles at higher points on the wheels. In addition to the action of the forward shoes and wheels there is a resultant action of the forward shoes and wheels, the same being in a force exerted downwardly on the rear ends of the bars, and hence across the fulcrum ends of the suspending-links 10, and tending to raise the forward ends of the bars and the shoes further aiding the manual and forward wheel forces. By the adjustment of the angles of engagement between the wheels, shoes, and bars an extremely sensitive and yet thoroughly reliable brake may be obtained, and further, a brake which will act through a very short space, and, as will be inferred from the above, with a comparatively small manual effort on the part of the motorneer.

The tendency to automatic action in this brake after the first instant of contact between the forward brake-shoes and the forward wheels, the reason for guarding against an overuse of automatic action, and the means for doing so, will be more perfectly understood by further reference to the drawings, and particularly by reference to Figs. 7 and 8 thereof. The forward shoes are hung as close to the rails as possible, while the rear shoes are preferably raised some distance from the same, so that the resisting force of the rear shoes which are fixed against vertical movement is brought more nearly into the line of a tangent from the peripheries of the forward wheels. The inclination of the bars may be varied according to the work required, but is seldom less than shown in the drawings.

In Fig. 7 the lower dotted lines, which indicate a possible position of the rear wheel and the brake-shoes, illustrate the minimum inclination and the position for a maximum thrust upon the peripheries of the forward wheels, and hence a maximum action by the forward wheels. The full lines are simply a repetition of the other figures of the drawings, while the upper set of dotted lines indicate the maximum inclination of the rod or bar and which would give a minimum thrust upon an action of the forward wheel. This maximum inclination, it will be seen, varies but a few degrees from a true tangent projected from the point of contact between the shoe and the forward wheel. The position of the forward shoes is more important than that of the rear shoes. The reason for this is that the rear shoes have a larger possible radius of movement, while a few inches of difference in the height of the front shoes from the rail effects a great difference in the resultant angles during action. This is brought out in Fig. 8, where the forward shoe is shown slightly raised above its proper position and where it will be seen that the tangent from the point of contact is shown in a more upright position.

Having thus described my invention, I claim as new and desire to secure by Letters Patent—

1. The combination, with a car-truck, of the brake-shoes arranged between the wheels and beneath the wheel-centers, bars or rods connecting and relatively fixing the pairs of shoes between the wheels on the same side of the truck, means upon the truck-frame for substantially fixing the shoes at one end of the truck against vertical movement, an equalizing-bar, connections between the equalizing-bar and the vertically-movable shoes, for moving said shoes into engagement with the upgoing surfaces or peripheries of the adjacent wheels, a brake-stand, and connections between said brake-stand and said equalizing-bar.

2. The combination, with a street-car constructed to run in one direction only and provided with a brake-stand on its front platform, of the brake-shoes arranged between the wheels and relatively fixing the pairs of shoes between the wheels on the same side, the pivotal links connecting the rear ends of said bars and the truck-frame, and adapted to hold the same against vertical movement, the bell-cranks pivoted upon the truck-frame, links extending between said bell-cranks and the forward ends of said bars, draft-rods connected with said bell-cranks and extending forward, an equalizing-bar connecting the draft-rods, and a connection between the brake-stand on the forward platform of the car and said equalizing-bar, all of said shoes being arranged beneath the wheel-centers, substantially as described.

3. The combination, with a street-car constructed to run in one direction only, and provided with a brake-stand on its front platform, of the brake-shoes arranged between the wheels and beneath the wheel-centers, bars or rods connecting and relatively fixing the pairs of shoes between the wheels on the same side of the truck, means upon the truck-frame for substantially fixing the rear shoe against vertical movement, bell-cranks pivoted upon the truck-frame, connections between said bell-cranks and the forward ends of said bars, draft-rods connecting said bell-cranks with an equalizing-bar, and a connection between said equalizing-bar and said brake-stand, substantially as described.

In testimony whereof I have hereunto set my hand this 10th day of September, A. D. 1894.

CLARENCE W. CARTER.

In presence of—
   C. G. HAWLEY,
   F. S. LYON.